UNITED STATES PATENT OFFICE 2,186,532

PLASTER MORTAR

Alfred Ladwig, Dusseldorf-Benrath, Germany, assignor, by mesne assignments, to Philadelphia Quartz Company, Philadelphia, Pa., a corporation of Pennsylvania No Drawing. Application September 2, 1936, Serial No. 99,095. In Germany September 14, 1935

5 Claims. (Cl. 106—24)

This invention relates to the production of mortars for plastering and, more particularly, to mortars which possess improved qualities of elasticity and impermeability to water.

The mortar most generally used heretofore for plastering purposes has usually been manufactured by mixing lime, cement, lime and cement, or materials of volcanic origin, such as trass, tuff, etc., with fine aggregate consisting of sand, ground rock, or slags of various kinds. An important disadvantage of these compositions is that plasters made with them, after a shorter or longer period of time, exhibit fissures passing through the entire layer of plaster, thereby enabling water to penetrate into the supporting masonry which should be protected. Moisture thus absorbed by the masonry is to a considerable extent prevented from escaping through the exterior surfaces of walls by the structure of the outside plaster. Instead, it penetrates to the interior of the walls and there results in the well known "sweating" of the walls in the interior of a building, with attendant damage to paint finishes, wall coverings and articles of furniture and particularly harmful effects on the health of occupants.

The formation of fissures in the known kinds of plaster is attributable not only to shrinkage of the plaster mass during drying or binding but also to the fact that the mass of plaster, due to its excessively slight elasticity, is unable to follow the expansion and contraction of the base or masonry upon which it is applied.

Another disadvantage of the known types of mortar is their permeability to water. Aside from the damage occasioned by the formation of fissures, it is difficult to render masonry building constructions free from moisture because of the penetration of moisture through the plaster from the outside.

It is therefore an object of my invention to provide improved mortars for plastering which possess sufficient elasticity to obviate the formation of fissures and their attendant harmful effects, and which are highly impermeable to water.

I have found that by including a substantial amount of solid, non-hydrated water glass in mortars for use as plaster materials, it is possible effectively to avoid the disadvantages above mentioned.

As a preferred embodiment of the invention, I employ a mixture containing trass, lime, cement and non-hydrated solid water glass, in which trass, is the principal component. Such a mixture is prepared by grinding the materials together to a fine state in one or more operations in order to obtain uniform distribution of all the components. The proportions of these components may be varied within wide ranges in accordance with the recognized practices of the art. Instead of using lime and cement, either lime or cement alone may be employed, as may be dictated by technical requirements.

Upon preparation of a mortar by combining such a mixture with water and a fine mineral aggregate such as sand in suitable manner to form a plaster of the desired consistency, I obtain a product which possesses superior qualities as compared with similar mortars lacking a content of non-hydrated water glass. For example, it has been found unexpectedly that a plaster made according to the present invention is not subject to the formation of fissures, irrespective of the physical form of the plaster, whether smooth, rough-cast or sprayed, and irrespective of the type of material to which it is applied, whether bricks, pumice stone, porous stone or cement slabs. The improved mortar exhibits sufficient elasticity and adaptability to the stresses which occur in the supporting masonry to remain free of fissures, a result which I attribute to the presence of the initially non-hydrated water glass and its slight solubility, which probably cause the reaction between the silica and the other components of the mortar to proceed comparatively slowly.

A further important advantage of the mortar of my invention is that plaster made therewith possesses a practically perfect impermeability to water. Hence it is possible completely to protect masonry buildings against moisture penetrating through the walls from the outside.

As a further embodiment of the present invention I may employ a mixture including finely divided blast furnace slag as the principal component, non-hydrated solid water glass and an addition of lime or cement, or both, and combine this mixture with sand or a like aggregate and water to form a plaster mortar. In this embodiment, the blast furnace slag replaces the trass of the embodiment described above, and a plaster possessing improved qualities similar to those of the first embodiment is obtained.

Example 1

A mixture including 42.5 parts of raw trass, 39 parts of burnt lime, 3.5 parts of cement lumps and 15 parts of solid, non-hydrated water glass, all parts by weight, is prepared by grinding the materials together in one or more operations to a predetermined fineness. This mixture is combined with sand and water by a suitable mechanical operation to form a mortar for plastering. The proportions of sand may be varied according to the grain size of the sand and the desired strength of the plaster, in keeping with the usual practice in making mortars for plastering.

In order to compare the mortar thus prepared with conventional kinds of mortar, the following compositions were prepared:

|   |   | Parts |
|---|---|---|
| (a) | Commercial trass cement (a mixture of trass and cement) | 1 |
|   | Sand | 3 |
| (b) | Commercial trass lime (a mixture of trass and lime) | 1 |
|   | Sand | 3 |
| (c) | Cement | 1 |
|   | Lime sand | 2 |

Smooth plasters of similar consistency were produced by the use of these four mixtures and were applied in each case to a wall of pumice stone. Examination of the plaster coatings after they had been applied clearly disclosed fissures of various sizes in the plasters containing compositions (a), (b) and (c); whereas, the plaster made by using the mortar of this example, containing non-hydrated water glass, gave a uniform structure completely free from fissures.

*Example 2*

Plaster made with the mortar containing non-hydrated water glass according to Example 1 was applied to (a) brick masonry, and (b) cement slabs in the form of smooth, rough-cast and sprayed coatings. Notwithstanding these different kinds of plaster coatings and the different types of supporting masonry, no fissure formation occurred in the plaster in any instance.

*Example 3*

A pumice brick was plastered on all sides with a layer, of a thickness of 2 cm., of the mortar containing non-hydrated water glass and prepared as described in Example 1. This brick was exposed to the open air and in an unprotected place to all conditions of weather. After a binding time of four weeks, the plastered brick was immersed for fourteen days in a container of water and was thus exposed to intensive, long-continued action of the water. Upon breaking the brick so treated, it was found that the water had penetrated only about half way through the plaster layer. The plaster immediately surrounding the brick was perfectly dry.

*Example 4*

A hollow brick of pumice stone plastered with mortar as described in Example 3 was exposed to the action of water in the same way as in Example 3. In this case also, the water did not wet the plaster layer adjacent the brick and was thus prevented from penetrating into the interior of the brick.

*Example 5*

A commercial trass lime was mixed with 15% by weight of ground solid non-hydrated water glass and then with sand in the volumetric proportions of 1:3. This mixture, containing the following amounts of ingredients by weight: 8.5 kg. trass lime, 1.5 kg. ground solid water glass, and 45 kg. sand, was converted to a suitable mortar by the addition of water.

For purposes of comparison, a similar mixture containing liquid water glass was prepared in the following proportions: 8.5 kg. trass lime, 3.6 kg. liquid water glass, and 45 kg. sand.

Each of the mortar compositions prepared as just described was applied to one square meter of brick wall and to three pumice stones. The mortar containing the liquid water glass exhibited no setting tendency and failed to form a hardened plaster surface since the mortar had set during admixture of the components. After an extended period of time had elapsed, this mortar remained soft so that it could readily be wiped off by the hand. In contrast thereto, the plaster surfaces formed by the mortar containing ground solid water glass were solid and hard.

The six pumice stones, three completely covered with the mortar containing solid non-hydrated water glass and three with the mortar containing liquid water glass, were stored in a moist condition for twenty days and then dried in air. After a drying period of thirteen days, the stones were immersed in water, and they were examined for water absorption after periods of immersion of 1, 5, 10, 20 and 120 minutes. The amounts of water absorbed by the plaster layers on the stones were determined by measuring progressive increases in the weights of the plastered stones, with the results indicated in the following table:

|   | Group I—Pumice stones plastered with mortar containing solid non-hydrated water glass | | | Group II—Pumice stones plastered with mortar containing liquid water glass | | |
|---|---|---|---|---|---|---|
|   | 1 | 2 | 3 | 1 | 2 | 3 |
| Weight dry (gr.) | 7830 | 7647 | 7764 | 6879 | 7219 | 6590 |
| After 1 min | 7869 | 7687 | 7797 | 7137 | 7462 | 7212 |
| Water absorption | 39 | 40 | 33 | 258 | 243 | 622 |
| After 5 min | 7896 | 7707 | 7817 | 7212 | 7537 | 7274 |
| Water absorption | 66 | 60 | 53 | 333 | 318 | 684 |
| After 10 min | 7917 | 7727 | 7832 | 7264 | 7582 | 7322 |
| Water absorption | 87 | 80 | 68 | 385 | 363 | 732 |
| After 20 min | 7927 | 7737 | 7844 | 7427 | 7627 | 7372 |
| Water absorption | 97 | 90 | 80 | 548 | 408 | 782 |
| After 120 min | 7952 | 7762 | 7860 | 7497 | 7767 | 7522 |
| Water absorption | 122 | 115 | 106 | 618 | 548 | 932 |

*Average increases in weight due to water absorption*

|   | Period of immersion | | | | |
|---|---|---|---|---|---|
|   | 1 min. | 5 min. | 10 min. | 20 min. | 120 min. |
| Group I | 37 | 60 | 78 | 89 | 114 |
| Group II | 374 | 445 | 493 | 579 | 699 |

After making determinations of the progressive increases in the weights of the stones due to water absorption, they were broken to enable inspection of the condition of the plaster. The layers of plaster on stones covered with mortar containing liquid water glass were thoroughly impregnated with water. The other samples, however, revealed that the water had penetrated into the layers of plaster containing solid non-hydrated water glass a distance of only 1 cm.

It is therefore apparent that the improved plaster mortars prepared according to my invention exhibit superior qualities of elasticity and resistance to moisture and that they are correspondingly more valuable for use in masonry construction as compared with similar plaster mortars heretofore known which do not contain solid non-hydrated water glass.

Mortar containing solid non-hydrated water glass is surprisingly superior to similar compositions including liquid water glass or equivalent amounts of solid hydrated water glass. Solid hydrated water glass readily absorbs moisture from the air and therefore tends to form a damp, lumpy mass; hence mortar mixtures prepared by the use of such material cannot be stored and are undesirable as plastering compositions. In like manner, mortar containing liquid water glass possesses such a high permeability to water that its use is undesirable; whereas the mortar of my invention exhibits none of these undesirable qualities. Moreover, as a further advantage of the solid non-hydrated water glass of my invention, I overcome the necessity of special treatments necessary to produce water glass of the liquid and hydrated types.

As explained hereinabove, the amount of solid non-hydrated water glass employed in the mortar mixtures of my invention may be chosen according to the amounts of other components in the mixture and the desired technical effect. The foregoing Examples 1 and 5, in which the weight of non-hydrated water glass in the mortar is about 15% of the weight of the other components, illustrate mixtures which produce good results. As a preferred range, I employ from about 10% to about 25% of non-hydrated water glass, in relation to the weight of the other components except mineral aggregate, such as sand, and water.

It is to be understood, however, that my invention is not limited to specific proportions of non-hydrated water glass, nor to the use thereof with specific mortar compositions, nor to specific proportions of other components of such compositions. The invention should be construed broadly within the spirit of the specification and the scope of the appended claims.

I claim:

1. A composition suitable for the preparation of a plaster mortar comprising a hydraulic binder, a finely divided, solid anhydrous water glass and a substance selected from a group consisting of trass and blast furnace slag, said substance being the principal component of the composition, the water glass being present in amount sufficient to impart high elasticity and waterproof characteristics to plaster coatings made from the mortar.

2. The composition of claim 1 wherein said anhydrous water glass is present in proportions ranging from about 10 to 25 per cent by weight, based on the weight of the mixture.

3. The composition of claim 1 wherein trass is the principal component.

4. The composition of claim 1 wherein blast furnace slag is the principal component.

5. The composition of claim 1 wherein said hydraulic binder is selected from a group consisting of lime and Portland cement.

ALFRED LADWIG.